(12) United States Patent
Kwong et al.

(10) Patent No.: US 12,526,454 B1
(45) Date of Patent: Jan. 13, 2026

(54) METHOD AND SYSTEM FOR COMPRESSING A VIDEO FRAME

(71) Applicants: Lingnan University, Hong Kong (CN); City University of Hong Kong, Hong Kong (CN)

(72) Inventors: Sam Tak Wu Kwong, Hong Kong (CN); Haifeng Guo, Hong Kong (CN)

(73) Assignees: Lingnan University, Hong Kong (CN); City University of Hong Kong, Hong Kong (CN)

( * ) Notice: Subject to any disclaimer, the term of this patent is extended or adjusted under 35 U.S.C. 154(b) by 0 days.

(21) Appl. No.: 18/822,963

(22) Filed: Sep. 3, 2024

(51) Int. Cl.
*H04N 19/60* (2014.01)
*H04N 19/137* (2014.01)
*H04N 19/172* (2014.01)

(52) U.S. Cl.
CPC ........... *H04N 19/60* (2014.11); *H04N 19/137* (2014.11); *H04N 19/172* (2014.11)

(58) Field of Classification Search
None
See application file for complete search history.

(56) References Cited

U.S. PATENT DOCUMENTS

2023/0336758 A1* 10/2023 Ikonin .................. H04N 19/59
2025/0150640 A1* 5/2025 Kim ..................... H04N 19/119

FOREIGN PATENT DOCUMENTS

WO    WO-2025026827 A1 *  2/2025  ............. G06T 9/002

OTHER PUBLICATIONS

Y. Xie, K. L. Cheng, and Q. Chen, "Enhanced invertible encoding for learned image compression," in Proceedings of the 29th ACM international conference on multimedia, 2021, pp. 162-170.
J.-F. Pambrun and R. Noumeir, "Limitations of the ssim quality metric in the context of diagnostic imaging," in 2015 IEEE International Conference on Image Processing (ICIP). IEEE, 2015, pp. 2960-2963.
J. Li, B. Li, and Y. Lu, "Deep contextual video compression," Proceedings of Advances in Neural Information Processing Systems, vol. 34, pp. 18 114-18 125, 2021.
X. Sheng, J. Li, B. Li, L. Li, D. Liu, and Y. Lu, "Temporal context mining for learned video compression," IEEE Transactions on Multimedia, pp. 1-12, 2022.
H. Guo, S. Kwong, D. Ye, and S. Wang, "Enhanced context mining and filtering for learned video compression," IEEE Transactions on Multimedia, vol. 26, pp. 3814-3826, 2024.
J. Behrmann, W. Grathwohl, R. T. Chen, D. Duvenaud, and J.-H. Jacobsen, "Invertible residual networks," in International conference on machine learning. PMLR, 2019, pp. 573-582.
M. Xiao, S. Zheng, C. Liu, Y. Wang, D. He, G. Ke, J. Bian, Z. Lin, and T.-Y. Liu, "Invertible image rescaling," in Proceedings of the European Conference on Computer Vision. Springer, 2020, pp. 126-144.

* cited by examiner

*Primary Examiner* — Samuel D Fereja
(74) *Attorney, Agent, or Firm* — S&F/WEHRW

(57) ABSTRACT

A method for compressing a video frame, comprising: generating, by an invertible neural network (INN) module, a reconstructed motion of a video frame based on an estimated motion between the video frame and a reconstructed video frame, the reconstructed video frame being a reconstruction of another video frame that occurs at a time instance before the video frame, the motion being a transformation from the another video frame to the video frame; and compressing, by a compression module, the video frame based on the reconstructed motion.

12 Claims, 13 Drawing Sheets

| Method | BD-RATE COMPARISON IN TERMS OF PSNR | | | | | | |
|---|---|---|---|---|---|---|---|
| | Class B | Class C | Class D | Class E | UVG | MCL-JCV | Average |
| HM (LDP) | 48.73% | 36.12% | 31.37% | 43.78% | 44.06% | 48.08% | 45.21% |
| HM (LDB) | 36.31% | 27.62% | 23.17% | 36.51% | 36.75% | 40.48% | 37.09% |
| EMC [15] | 202.52% | 209.25% | 148.51% | 198.79% | 208.51% | 262.58% | 233.53% |
| DCVC [14] | 51.92% | 81.90% | 52.51% | 95.92% | 52.17% | 74.14% | 69.33% |
| DEVC [19] | 36.22% | 58.25% | 30.40% | 73.32% | 30.15% | 63.68% | 54.28% |
| DCVC TCM* [18] | 25.60% | 45.27% | 16.11% | 39.54% | 19.21% | 44.81% | 37.19% |
| Ours | 24.69% | 40.65% | 9.97% | 33.64% | 30.33% | 43.99% | 36.96% |

BD-RATE COMPARISON IN TERMS OF MS-SSIM

| Method | Class B | Class C | Class D | Class E | UVG | MCL-JCV | Average |
|---|---|---|---|---|---|---|---|
| HM (LDP) | 48.87% | 38.14% | 33.67% | 52.05% | 47.02% | 56.86% | 51.37% |
| HM (LDB) | 36.69% | 30.18% | 26.66% | 44.43% | 40.59% | 48.95% | 43.34% |
| EMC [15] | 33.33% | 45.13% | 13.25% | 73.30% | 61.51% | 94.84% | 73.51% |
| DCVC [14] | -10.42% | 7.52% | -4.03% | 57.88% | 14.17% | 9.49% | 8.80% |
| DEVC [19] | -35.03% | -7.80% | -19.96% | 28.62% | -8.31% | -3.06% | -5.67% |
| DCVC TCM* [18] | -10.82% | -0.67% | -22.48% | 13.78% | 12.45% | 24.58% | 13.57% |
| Ours | -10.66% | -2.48% | -26.76% | 1.16% | 20.96% | 18.66% | 10.79% |

ABLATION STUDY OF INVERTIBLE ENCODING STRUCTURE IN TERMS OF PSNR

| Method | Class B | Class C | Class D | Class E | UVG | MCL-JCV | Average |
|---|---|---|---|---|---|---|---|
| Ours | 0.00% | 0.00% | 0.00% | 0.00% | 0.00% | 0.00% | 0.00% |
| W/O feature enhancement | 10.87% | 9.27% | 7.50% | 3.93% | 8.49% | 10.16% | 9.38% |
| W/O attentive channel squeeze | 29.48% | 25.39% | 22.82% | 26.64% | 29.57% | 27.59% | 27.45% |

| INVESTIGATION OF DIFFERENT ATTENTIVE CHANNEL SQUEEZE METHODS IN TERMS OF MS-SSIM | | | | | | | |
|---|---|---|---|---|---|---|---|
| Method | Class B | Class C | Class D | Class E | UVG | MCL-JCV | Average |
| Ours | 0.00% | 0.00% | 0.00% | 0.00% | 0.00% | 0.00% | 0.00% |
| Without GDN layer | 1.80% | -6.47% | -3.27% | -12.38% | 8.19% | 4.05% | 2.11% |
| With Average Pooling | 3.57% | 5.93% | 8.42% | 10.01% | 1.52% | 4.42% | 4.69% |

|   | Params. (M) | MACs (T) | Enc time (s) | Dec time (s) |
|---|---|---|---|---|
| DCVC [14] | 7.9 | 2.4 | 12.26 | 35.59 |
| DEVC [19] | 8.5 | 3.5 | 12.51 | 36.32 |
| DCVC TCM [18] | 10.7 | 2.9 | 0.88 | 0.47 |
| Ours | 32.06 | 3.7 | 1.09 | 0.64 |

METHOD AND SYSTEM FOR COMPRESSING A VIDEO FRAME

FIELD

The present disclosure relates generally to a method and system for compressing a video frame.

BACKGROUND

Video compression standards from Advanced Video Coding (AVC), High Efficiency Video Coding (HEVC), Versatile Video Coding (VVC) to Enhanced Compression Model (ECM) have developed rapidly to deliver higher quality video with fewer bit consumption. Meanwhile, deep learning has shown its powerful ability and has achieved state-of-the-art (SOTA) in various vision tasks. Consequently, researchers have pursued the integration of deep learning into video compression, leading to a surge of interest in learning-based video compression methods. Unlike traditional standards with hand-crafted technologies, deep learning-based methods focus on joint optimization with end-to-end training.

The first Deep Video Compression (DVC) method was proposed to follow the traditional codec workflow by replacing traditional modules with deep neural networks. In DVC, the predicted frame is generated, and its residue is encoded with the current frame. Moreover, considering the entropy of residue coding is greater than or equal to that of conditional coding, the Deep Contextual Video Compression (DCVC) method was presented as a conditional coding-based deep video compression approach. In DCVC, valuable context is extracted as a condition to compress the current frame.

The above deep video compression methods typically utilize an autoencoder-style network for encoding and decoding. Although auto-encoders possess the ability to capture important information for reconstruction, any neglected information during the encoding process is typically lost and cannot be recovered during decoding.

New methods, apparatus, systems that assist in advancing technological needs and industrial applications in this area are desirable.

SUMMARY

A method comprises generating, by an invertible neural network (INN) module, a reconstructed motion of a video frame based on an estimated motion between the video frame and a reconstructed video frame, the reconstructed video frame being a reconstruction of another video frame that occurs at a time instance before the video frame, the motion being a transformation from the another video frame to the video frame; and compressing, by a compression module, the video frame based on the reconstructed motion.

Other embodiments will be described herein.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the disclosure will be better understood and readily apparent to one of ordinary skill in the art from the following written description, by way of example only, and in conjunction with the drawings, in which:

FIG. 6 shows a table for Bjontegaard delta rate (BD-rate) comparison in terms of PSNR according to certain embodiments of the present disclosure.

FIG. 8 shows a table for BD-rate comparison in terms of PSNR according to certain embodiments of the present disclosure.

FIG. 10 shows a table for ablation study of invertible encoding structure in terms of PSNR according to certain embodiments of the present disclosure.

FIG. 11 shows a table for investigation of different attentive channel squeeze methods in terms of MS-SSIM according to certain embodiments of the present disclosure.

FIG. 12 shows a table for complexity comparison according to certain embodiments of the present disclosure.

DETAILED DESCRIPTION

Figure 1:
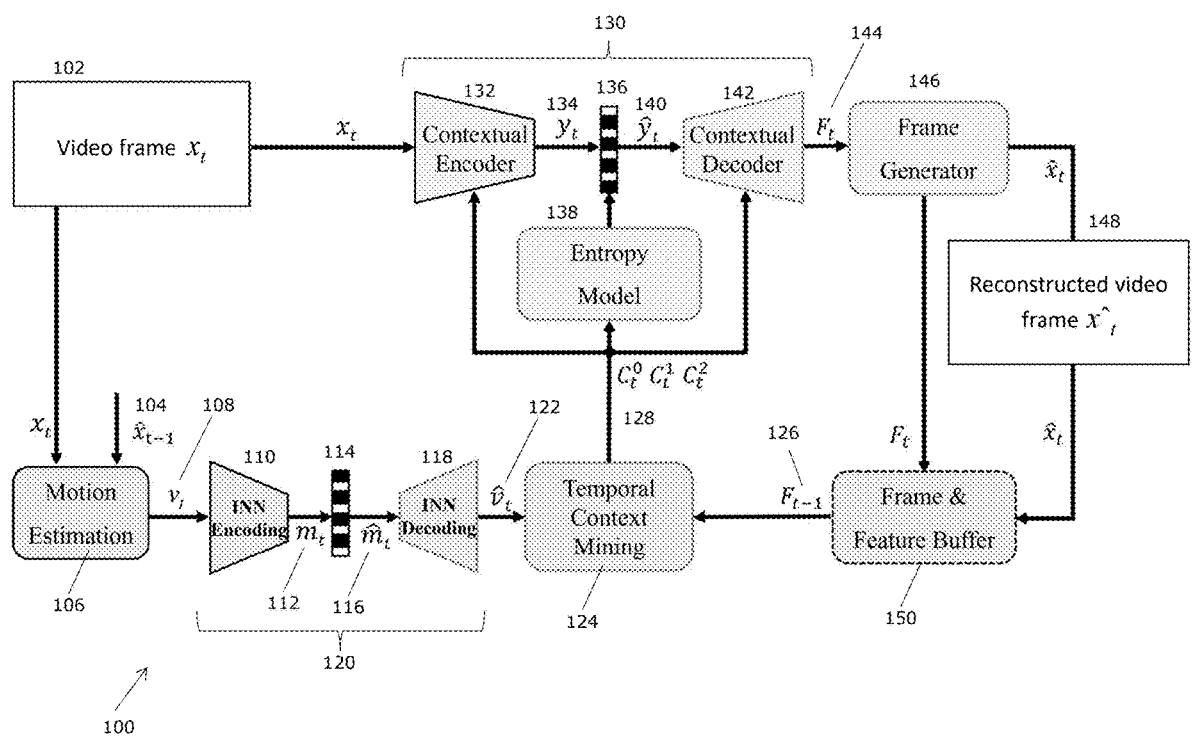
FIG. 1 shows an exemplary overview and workflow for a method for compressing a video frame according to certain embodiments of the present disclosure.

Embodiments of the present disclosure will be described, by way of example only, with reference to the drawings. Like reference numbers and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "detecting", "estimating", "comparing", "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

EXEMPLARY EMBODIMENTS

Various embodiments of the present disclosure relate to a method and system for compressing a video frame.

Definition of Terms

In the present disclosure, a video frame refers to a visual representation as commonly known in the art that is captured at a point in time as a frame in a video (e.g., a video comprising a plurality of video frames). A video frame (also referred to herein as a frame) may be from a source domain (e.g., a dataset with labels and ground truth information) or from a target domain (e.g., a dataset from which a shape of an object is to be determined), and may be used as input in, for example, a learning based video frame compression system as disclosed herein for compressing the video frame (e.g., reducing a file size of the video frame by reducing the amount of data needed to represent its content, but without losing too much visual information).

A motion refers to a transformation from a first video frame to a second video frame (e.g., the second video frame occurring at a time instance after the first video frame, for instance adjacent frames in a video sequence), and may be treated as a difference between the first video frame and the second video frame. The transformation may be a movement of an object (e.g., a pixel in a video frame, an entity captured in a video frame, or other similar object) from the first video frame to the second video frame, a translation into a z-plane, a rotation, a zoom, a displacement, or other similar movement from the first video frame to the second video frame. As disclosed herein, a motion may be estimated (e.g., by a motion estimation module based on a video frame and a reconstructed video frame (also referred to herein as a decoded video frame), the reconstructed video frame being a reconstruction of another video frame that occurs at a time instance before the video frame), and a motion vector (e.g., a vector describing the transformation from one video frame to another) may be generated by an invertible neural network (INN) module based on the estimated motion. The reconstructed video frame is used as input to obtain information relating to the motion, for example by feeding a feature (e.g., $F_t$) associated with the reconstructed frame into a temporal context mining module to generate one or more temporal contexts. Temporal contexts are three-level contexts of different sizes, and the temporal contexts contain temporal information between the video frame and the reconstructed video frame. The temporal contexts may then be used as a condition to compress the video frame. The motion may be estimated by an optical flow algorithm such as SpyNet or other similar algorithm. The motion vector may be referred to herein as a reconstructed motion.

Figure 2:
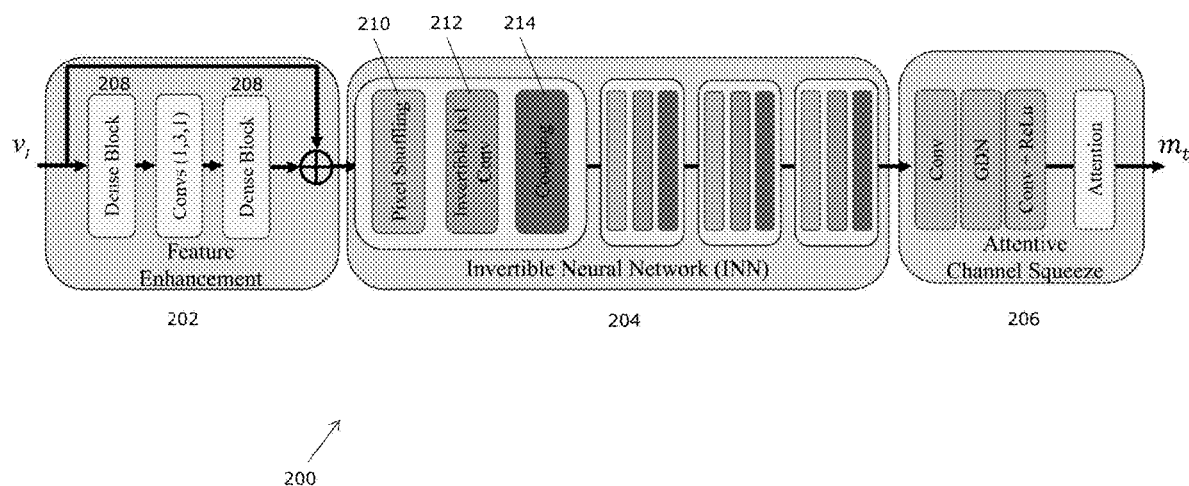
FIG. 2 shows an exemplary illustration of an invertible neural network-based encoding module according to certain embodiments of the present disclosure.
Figure 3:
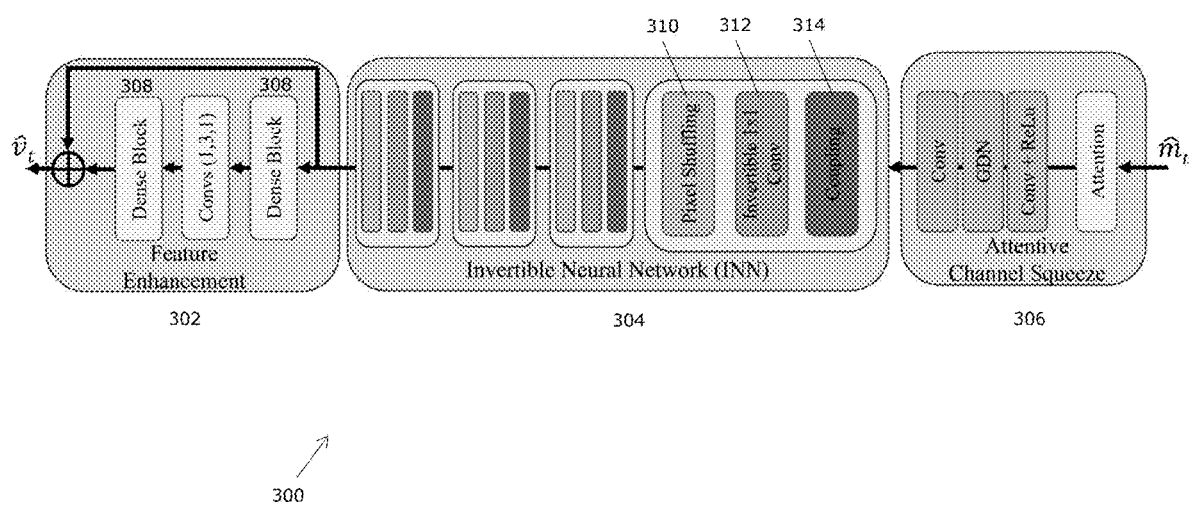
FIG. 3 shows an exemplary illustration of an invertible neural network-based decoding module according to certain embodiments of the present disclosure.

The INN (e.g., a network that is configured to reconstruct input data from output data) module may comprise an encoding module that is configured to generate a latent representation (e.g., a simplified model of input data, for example, created by a neural network) based on the estimated motion, a quantizer configured to quantize the latent representation, and a decoding module configured to generate the reconstructed motion from the quantized latent representation. For example, the motion is encoded with an INN-based encoder (as shown in FIG. 2) and decoded with an INN-based decoder (as shown in FIG. 3) to obtain the reconstructed motion. The encoding/decoding module may also be referred to herein as INN encoding/decoding module and encoding/decoding network module. The encoding module and decoding module may each comprise an attentive channel squeeze module that is configured to reduce channel dimension of the reconstructed motion, which advantageously improves overall compression performance. The attention squeeze module may further comprise a Generalized Divisive Normalization (GDN) module that is configured for gaussianizing an image density associated with the reconstructed motion, which can advantageously enhance the model's ability to generalize. Furthermore, each of the encoding and decoding module may further comprise a feature enhancement module (e.g., a module built upon Dense Block or other similar model configured to operate in a residual manner prior to integrating the INN module architecture) configured for reducing channel dimension of the reconstructed motion.

A feature refers to an attribute or variable associated with the video frame that may be extracted (e.g., by a feature extractor) from the video frame for use in compressing the video frame. The feature may be extracted from the video frame by, for example, a Convolutional Neural Network (CNN) or other similar method. For example, the video frame compression system disclosed herein may also comprise a temporal context mining module that is configured for generating one or more temporal contexts based on the reconstructed motion and a feature associated with the reconstructed video frame. Further, the compression module may generate a reconstructed feature associated with the video frame based on the one or more temporal contexts and the video frame, and a compressed video frame (e.g., a reconstruction of the video frame) may be generated based on the reconstructed feature e.g., by feeding the reconstructed feature into a frame generator. It will be appreciated that the reconstructed feature may then be propagated for a next frame compression.

DETAILED DESCRIPTION

Deep video compression methods typically use autoencoder-style networks for encoding and decoding. Although auto-encoders possess the ability to capture important information for reconstruction, any neglected information during the encoding process is typically lost and cannot be recovered during decoding. To address the issue of information loss, a potentially effective solution is to utilize invertible neural networks (INNs) as a replacement for the original encoder-decoder. Due to the desirable property of strict invertibility of INNs, which aids in preserving information throughout the encoding and decoding processes, INNs were widely explored for image compression. For example, the utilization of INN for image compression achieved promising results in the high bpp (bits per pixel) range. Furthermore, an invertible encoding has been proposed to mitigate spatial information with a feature enhancement module to enhance the representation capacity and an attentive channel squeeze layer to allow flexible adjustment of the feature dimension.

Motivated by the success of INN-based encoding and decoding for learned image compression, invertible encoding for deep video compression is proposed herein in the present disclosure. Unlike image compression, which mainly focuses on intra-spatial information, invertible encoding is leveraged for inter-temporal information in deep video compression. During exploration, INN-based encoding-decoding is incorporated into video compression for motion compression. However, it is noted that Peak Signal-to-Noise Ratio (PSNR) weights every change in pixel values equally, while Multi Scale Structural Similarity Index Method (MS-SSIM) scores the image pair similarly in luminance, contrast, and correlation, respectively. Additionally, it has been noted that SSIM has a limitation in that uniform pooling should be avoided if the image statistics are not homogeneous. When it comes to motion, utilizing uniform pooling directly may lead to inferior MS-SSIM performance, particularly in cases where optical flow is not homogeneous. Therefore, a novel attentive channel squeeze module is proposed without pooling operations to advantageously improve the performance, especially for MS-SSIM. In addition, the proposed attentive channel squeeze approach is further designed with a Generalized Division Normalization (GDN) layer to advantageously enhance the generalization ability.

Thus, a novel encoding-decoding method based on INNs is disclosed herein to seamlessly integrate it into the conditional coding framework for motion compression. Moreover, an attentive channel squeeze module is designed to improve overall compression performance. Through extensive experiments as further disclosed herein, the correctness and effectiveness of the proposed method are validated. Compared to the HEVC low delay P configuration, the present method achieves an average of 8.25% bit savings in terms of PSNR. Regarding MS-SSIM, the present method outperforms it with 40.58% bit savings. Compared to directly applying the enhanced invertible encoding (as seen in the state of the art), the proposed method can achieve a bit savings of 2.78% regarding MS-SSIM while 0.23% savings in terms of PSNR.

The pipeline of the conditional coding approach is shown in illustration 100 of FIG. 1. Initially, a current frame (e.g., a video frame 102) is denoted as $x_t$, while $\hat{x}_{t-1}$ represents a previously decoded frame 104 (e.g., another video frame occurring at a time instance before the video frame). Subsequently, a motion estimation network 106 estimates the optical flow between the current frame 102 $x_t$ and the previously decoded frame 104 $\hat{x}_{t-1}$, obtaining an estimated motion 108 denoted as $v_t$. Following that, the proposed invertible encoding-decoding (e.g., INN module 120 comprising an INN encoding module 110, a quantizing module 114 and an INN decoding module 118) is employed to compress the estimated motion 108 $v_t$ and reconstruct $v_t$ back to $\hat{v}_t$ (e.g., reconstructed motion 122). For example, the INN encoding module 110 may generate a latent representation 112 denoted as $m_t$ based on estimated motion 108, the quantizer 114 may quantize the latent representation 112 $m_t$ to generate a quantized version 116 denoted as $\hat{m}_t$, and the INN decoding module 118 may decode the quantized version 116 $\hat{m}_t$ to generate the reconstructed motion 122 $\hat{v}_t$. Next, the reconstructed motion 122 $\hat{v}_t$ and previously decoded frame feature 126 denoted as $F_{t-1}$ are fed into a temporal context mining network module 124 to generate temporal contexts 128 denoted as $C_t^0, C_t^1, C_t^2$. Furthermore, by filling the temporal contexts 128 into a compression module 130 (e.g., comprising a contextual encoder 132, a quantizing module 136, an entropy model 138 and a contextual decoder 142), the current frame 102 $x_t$ is compressed to obtain a reconstructed feature 144 denoted as $F_t$. For example, the contextual encoder 132 may encode the current frame 102 $x_t$ with the help of the temporal contexts 128 to generate a latent representation 134 denoted as $y_t$, the entropy model 138 and quantizer 136 may generate a quantized version 140 (denoted as $\hat{y}_t$) of the latent representation 134 $y_t$ based on the latent representation 134 $y_t$ and the temporal contexts 128, and the contextual decoder 142 may generate the reconstructed feature 144 $F_t$ based on the quantized version 140 $\hat{y}_t$ and the temporal contexts 128. Finally, the reconstructed feature 144 $F_t$ is utilized to generate (e.g., by a frame generator 146) a reconstructed frame 148 denoted as $\hat{x}_t$. $F_t$ and $\hat{x}_t$ may be stored in a buffer (e.g., frame and feature buffer module 148) as references for subsequent frame compression. A spatial pyramid network (a method to estimate the motion between a current frame and a previous reconstructed frame) may be applied to estimate the motion $v_t$. Additionally, a factorized entropy model (an entropy model to generate bitstream) may be adopted for a hyperprior (a prior distribution on a hyperparameter, that is, on a parameter of a prior distribution) to make the decoding processes of the present system parallelization friendly. The hyperprior refers to a hyperprior representation of a latent representation. With the hyperprior, frame compression efficiency is advantageously improved.

The proposed invertible encoding network module 110 is further depicted with more details in illustration 200 of FIG. 2, and the decoding network module 118 is further depicted with more details in illustration 300 of FIG. 3. As explained above, the invertible neural network-based encoding-decoding (e.g., INN network module 120) is configured to convert the motion 108 $v_t$ to latent motion representation 112 $m_t$ and transform the quantized representation 116 $\hat{m}_t$ back to the reconstructed motion 122 $\hat{v}_t$. In order to address the limited capacity of INN non-linear representation, feature enhancement modules 202 and 302 may be incorporated into each of the encoding network module 200 and the decoding network module 300 respectively, which operates in a residual manner prior to integrating the INN architecture, aiming to enhance the nonlinear capability of the network. The feature enhancement modules 202 and 302 may be built upon Dense Block (e.g., dense block functions 208 and 308), or other similar model. Moreover, the INN structures 204 and 304 may be stacked with four invertible blocks, where each block sequentially contains a pixel shuffling layer 210 or 310, invertible 1×1 Convolution layer 212 or 312, and coupling layer 214 or 314. Empirically, the kernel sizes of the coupling layers for the four blocks may be set as k=3, 3, 3, 3. It is worth mentioning that all operations within INNs maintain the total pixel count of the input tensor, many of which are redundant pixels. Therefore, attentive channel squeeze modules 206 and 306 may be applied at each of the encoding network module 200 and the decoding network module 300 respectively to reduce channel dimension of the output tensor of INNs (e.g., reduce channel dimension of the reconstructed motion 122). Thus, the whole process of invertible encoding and decoding may be formulated as follows:

$$m_t = f_{att}\{f_{INN}[f_{enh}(v_t) + v_t]\}, \quad (1)$$

$$\hat{v}_t = f_{enh}'\{f_{INN}'[f_{att}'(\hat{m}_t)]\} + f_{INN}'[f_{att}'(\hat{m}_t)] \quad (2)$$

where $f_{enh}$ is the feature enhancement module 202, $f_{INN}$ is the stacked INN structure 204, and $f_{att}$ is the attentive channel squeeze module 206 (e.g., in the encoding module 200). Moreover, $f_{enh}'$, $f_{INN}'$, and $f_{att}'$ are the corresponding enhancement module 302, INN structure 304 and attentive channel squeeze module 306 respectively (e.g., in the decoding module 300). $v_t$ is the motion between current frame $x_t$ and previous reconstructed frame $\hat{x}_{t-1}$. $m_t$ is the latent representation and $\hat{m}_t$ is the corresponding quantized version.

Figure 4:
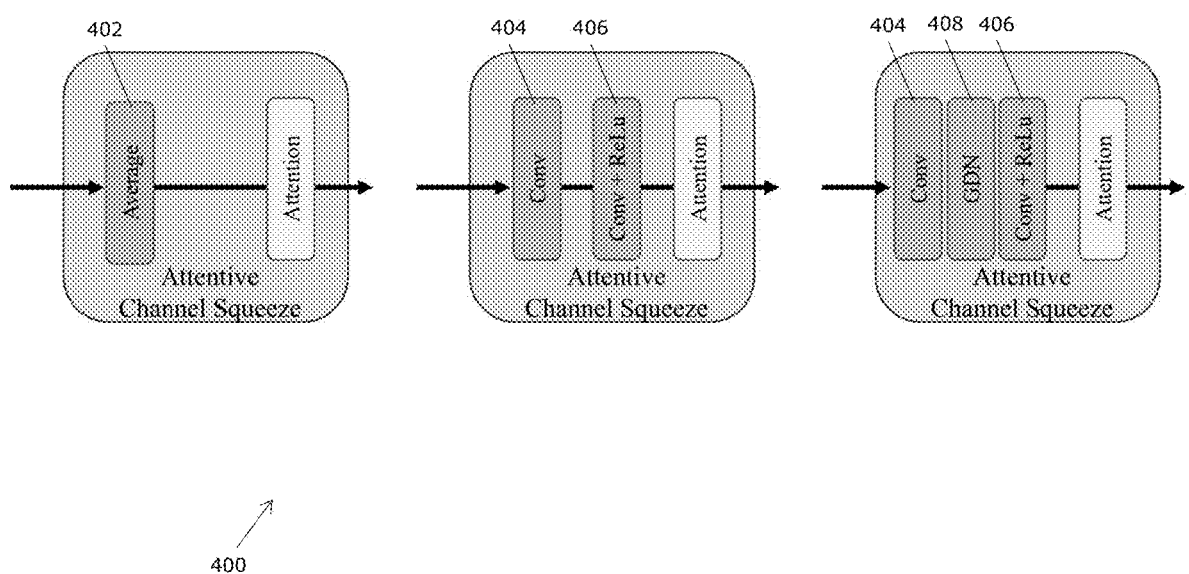
FIG. 4 shows exemplary attentive channel squeeze methods according to certain embodiments of the present disclosure.

Several attentive channel squeeze methods as shown in illustration 400 of FIG. 4 may be utilized for the attentive channel squeeze module. In an example, an average pooling operation 402 may be directly applied to reduce channel dimension of INNs' output tensor. However, it is found that uniform pooling should be avoided if image statistics are not fairly homogeneous. Further, directly applying uniform pooling may result in worse MS-SSIM performance when optical flow is not fairly homogeneous. Therefore, the performance of MS-SSIM may be improved without the average pooling operation 402, and instead a Convolution (Conv)+Conv+rectified linear unit (ReLu) solution may be applied by incorporating a Conv layer 404 and a Conv+ReLu layer 406 in the attentive channel squeeze module. Furthermore, Generalized Divisive Normalization (GDN) has been shown to be effective in gaussianizing image densities, which can advantageously enhance the model's ability to generalize. Therefore, to enhance the generalization ability of the model, a GDN layer 408 may be incorporated into the attentive channel squeeze module. In conclusion, the disclosed model design is based on a foundation that the MS-SSIM performance may degrade with the pooling operation. Moreover, GDN may be utilized to enhance the model generalization ability. Experiment results have demonstrated and validated the effectiveness of the proposed model design.

In training the proposed model, a Vimeo-90k dataset may be employed. Throughout the training process, one or more videos are randomly cropped into patches of 256×256. The whole framework is trained jointly to minimize the loss function as follows:

$$L = \lambda \times D + R \quad (3)$$

$\lambda$ balances the trade-off between the bitrate R and distortion D. Further, distortion D may be measured with peak signal-to-noise ratio (PSNR) and multiscale structural similarity (MS-SSIM).

The present model may be implemented using, for example, PyTorch on an NVIDIA A100 graphics processing unit (GPU) or other similar GPUs. For training, four different models were processed each with different $\lambda$ values. For PSNR, values 256, 512, 1024, and 2048 were used; for MS-SSIM, values 8, 16, 32, and 48 were utilized. Furthermore, a learning rate is set to 1e-4 at the beginning and reduced to 1e-6 by a factor of 10 when the performance stopped improving. Moreover, the PSNR-oriented model is also fine-tuned to achieve the MS-SSIM-oriented model.

For analysis of the experiment results as disclosed herein, traditional compression methods High Efficiency Video Coding (HEVC) and Versatile Video Coding (VVC) were utilized for comparative analysis. Given that deep video compression works in the red, green, and blue (RGB) domain, the RGB space is used as basis for comparison when computing the PSNR and MS-SSIM values. The models are tested on HEVC Class B, Class C, Class D, Class E, open Ultra Video Group (UVG) and Media Communications Lab Just Noticeable Difference (JND)-based Coded Video (MCL-JCV) datasets. The Group of Pictures (GOP) is set to 10 for HEVC sequences and 12 for non-HEVC sequences. Moreover, based on a focus on inter-frame coding, learning-based image compression methods cheng2020anchor and IntraNoAR were selected to compress intraframes for PSNR and MS-SSIM, respectively. Meanwhile, several typical learning-based video compression methods were also utilized for comparison, including enhanced motion compensation (EMC), Deep Contextual Video Compression (DCVC), Disparity Estimation based Video Codec (DEVC) and DCVC temporal context mining (TCM). It is noted that the DCVC TCM that is utilized in the disclosed experiments is a reproduced DCVC TCM version with INN-based enhanced encoding from prior art for motion compression.

Figure 5:
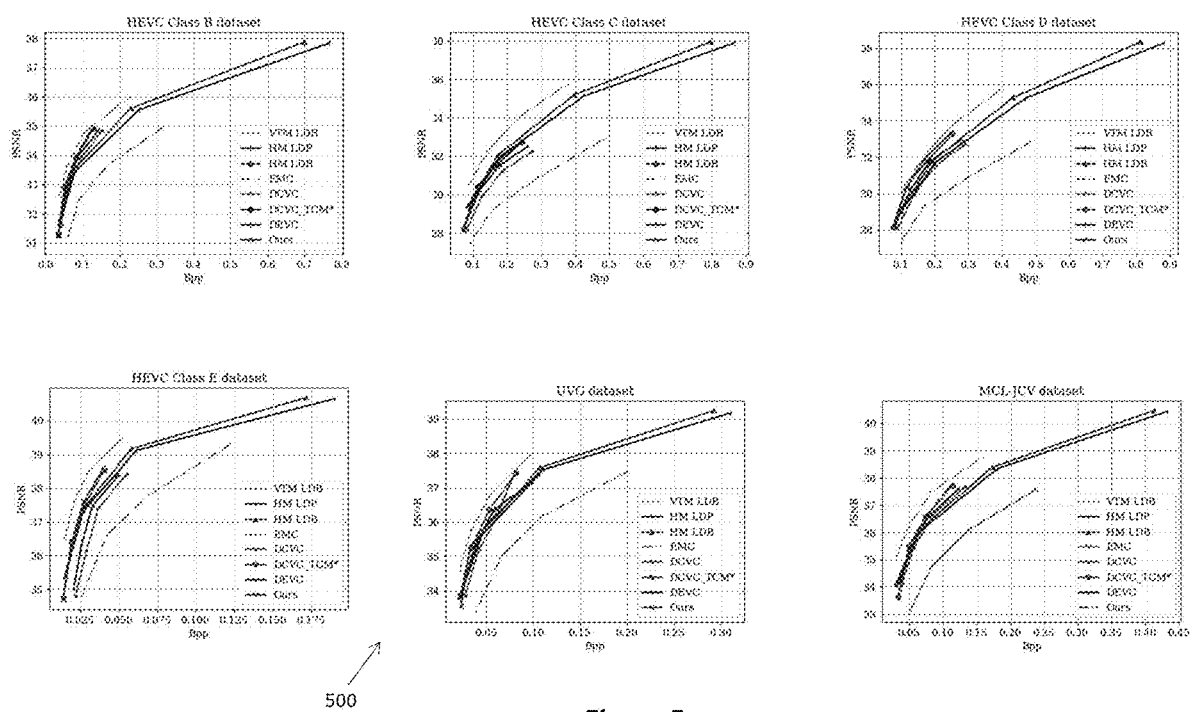
FIG. 5 shows exemplary results for Peak Signal-to-Noise Ratio (PSNR) performance comparison according to certain embodiments of the present disclosure.
Figure 7:
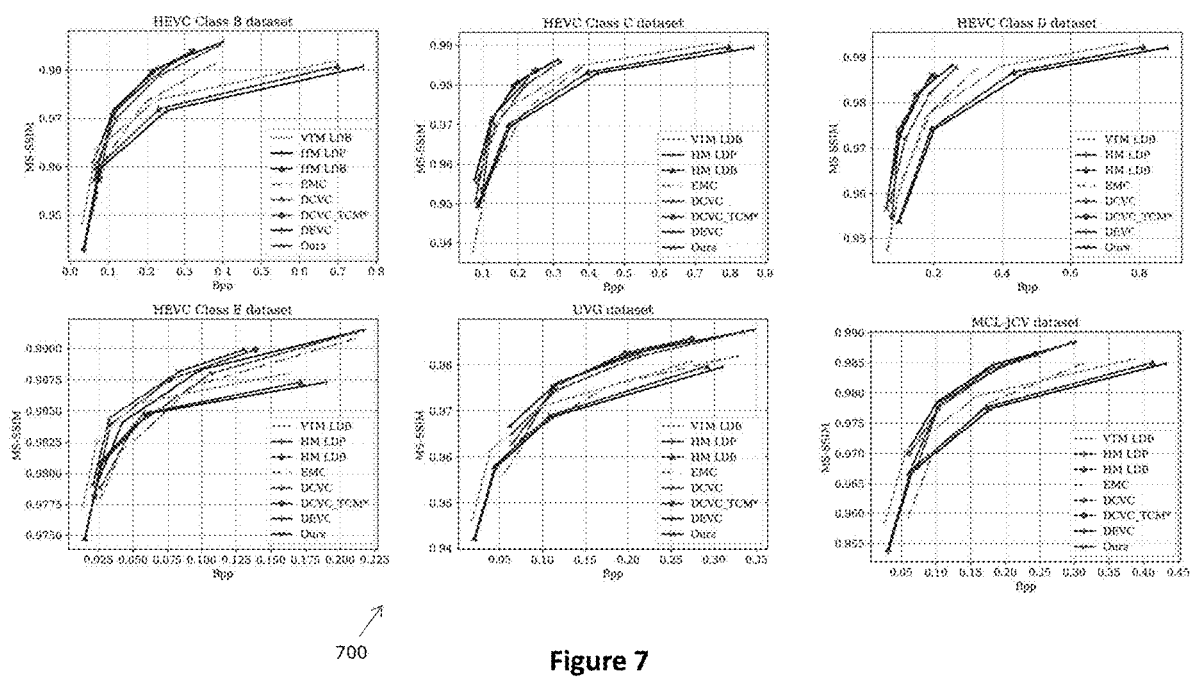
FIG. 7 shows exemplary results for Multi Scale Structural Similarity Index Method (MS-SSIM) performance comparison according to certain embodiments of the present disclosure.

The performance of the proposed method is assessed using the BD-Rate metric. A comparison of PSNR and MS-SSI with different video compression methods was conducted, using a VVC Test Model (VTM) low-delay B configuration as the anchor. The results are presented in table 600 of FIG. 6 and table 800 of FIG. 8. In the tables 600 and 800, positive numbers indicate higher bitrate consumption, and the best and second best video compression results are circled and underlined, respectively. To provide a visual representation of the coding performance, we also plotted the bits per pixel (bpp) on the horizontal axis and the reconstructed PSNR/MS-SSIM on the vertical axis. These performance curves are depicted in illustration 500 of FIG. 5 (e.g., comparing PSNR performance) and illustration 700 of FIG. 7 (e.g., comparing MS-SSIM performance), respectively.

It is observed that the proposed method, which utilizes the proposed invertible neural network-based encoding and decoding, can surpass the High-Efficiency Video Coding Test Model (HM) in both PSNR and MS-SSIM. In particular, compared to the low delay P (LDP) configuration of HM, the proposed method achieves a bit saving of 8.25% with PSNR-oriented optimization. Regarding MS-SSIM, the proposed method outperforms HM LDP by 40.58%. Compared to learning-based video compression methods, our method can surpass EMC by a large margin, around 196.57%/62.72% in terms of PSNR/MS-SSIM. Moreover, the proposed method is better than DCVC by 32.37% on average in terms of PSNR and worse than DCVC by 0.99%. Furthermore, compared to DEVC, the proposed method shows a better PSNR with an improvement of 17.31%. Thus, inclusion of an attentive channel squeeze method for the proposed method advantageously achieved a superior MS-SSIM performance.

It is worth mentioning that the proposed method cannot be directly compared to existing methods that aims to improve compression performance of an image, since the proposed method is for video compression (e.g., video comprising a plurality of video frames). Although an image can be treated as an intra-frame in a video, the focus of the proposed method is on inter-frame coding.

Thus, for a fair comparison, by directly incorporating INN-based encoding-decoding from existing methods (e.g., existing methods that aim to improve compression performance of an image as mentioned above) into DCVC TCM as known in the state of the art, the reproduced DCVC TCM as utilized in the disclosed experiments is obtained. Based on comparison with the DCVC TCM, the proposed method can advantageously outperform it with a 2.78% improvement on average in terms of MS-SSIM. Meanwhile, the proposed method can achieve a gain of 0.23% regarding PSNR. The comparison results to DCVC TCM thus verify the correctness and effectiveness of the proposed method.

Figure 9:
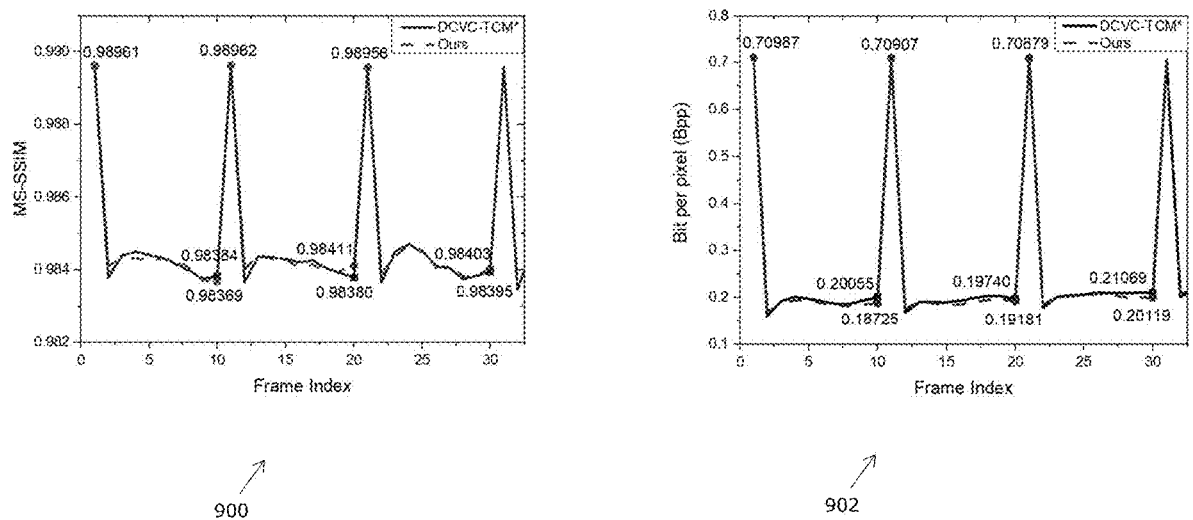
FIG. 9 shows exemplary results analysis of Bitrate and MS-SSIM propagation comparison between DCVC TCM and the proposed method according to certain embodiments of the present disclosure.

To conduct an error propagation analysis, a RaceHorses sequence is selected from the HEVC Class B dataset as a representative example. The bitrate and MS-SSIM performance are compared between the proposed method and the DCVC TCM. Within a Group of Pictures (GOP), a first frame is encoded as an I frame, which consumes higher bit rates and demonstrates better reconstructed frame quality. Subsequent P frames were encoded separately using the proposed method and DCVC TCM. The results of error propagation, as depicted in graph 900 (MS-SSIM propagation comparison between DCVC TCM and the proposed method) and graph 902 (Bitrate comparison between DCVC TCM and the proposed method) of FIG. 9, clearly indicate that the proposed method advantageously achieves comparable reconstruction quality with a reduced number of bits compared to DCVC TCM, which provides evidence supporting the accuracy and effectiveness of the proposed method.

Further, model complexity is evaluated based on a number of parameters, multiply-accumulate operations (MACs), and the encoding-decoding time. Moreover, DCVC, DEVC, and DCVC TCM were taken as baselines for comparison with the proposed method as shown in Table 1200 of FIG. 12. The parameter number of the proposed method is 32.06 M. Taking 1920×1080 frame as input, the MACs is 3.7 T. Moreover, it takes 1.09 s to encode and 0.64 s to decode it. It is noted that this is because the time-consuming autoregressive entropy model is applied in DCVC and DEVC. In contrast, the factorized entropy model for hyperprior, which makes the decoding processes parallelization friendly, is applied in DCVC TCM and the proposed method. Compared to DCVC and DEVC, the proposed method can advantageously take less time to encode and decode. Furthermore, the parameter number of the proposed method is 21.36M more than DCVC TCM. The possible reason is encoder-decoder style method includes up-down sampling, which can reduce the parameter number obviously. At the same time, all operations within INNs maintain the total pixel count of the input tensor, resulting in more parameter consumption.

To study the effectiveness of the components in the proposed invertible neural network-based encoding-decoding method, feature enhancement and attentive channel squeeze are individually excluded and a final solution is taken as an anchor to report the performance results in table 1000 of FIG. 10. As shown in table 1000, using feature enhancement to improve the non-linear capability of INN can bring about an improvement in compression performance of 9.38%. Moreover, with the proposed attentive channel squeeze module, 27.45% performance improvement is obtained. These results prove that the capability of INN is successfully improved with feature enhancement (e.g., via feature enhancement modules 202 and 302), and the performance is further enhanced with the proposed attentive channel squeeze (e.g., via attentive channel squeeze modules 206 and 306).

To investigate the effectiveness of attentive channel squeeze, the final solution as previously mentioned is taken as the anchor and the performance comparison is as shown in table 1100 of FIG. 11. Compared with the average pooling method, the proposed method can advantageously surpass it with 4.69% performance improvement, which verifies the correctness of the proposed method without pooling operation. Furthermore, influence of the GDN layer (e.g., GDN layer 408) is studied and a performance comparison is demonstrated. Without the GDN layer, the performance is better in Class C, Class D, and Class E datasets. However, it is also observed that a 2.11% performance gain on average is obtained with GDN. This result corresponds to the idea that the GDN layer can enhance the generalization ability of the model, verifying the effectiveness of the proposed method.

Figure 13:
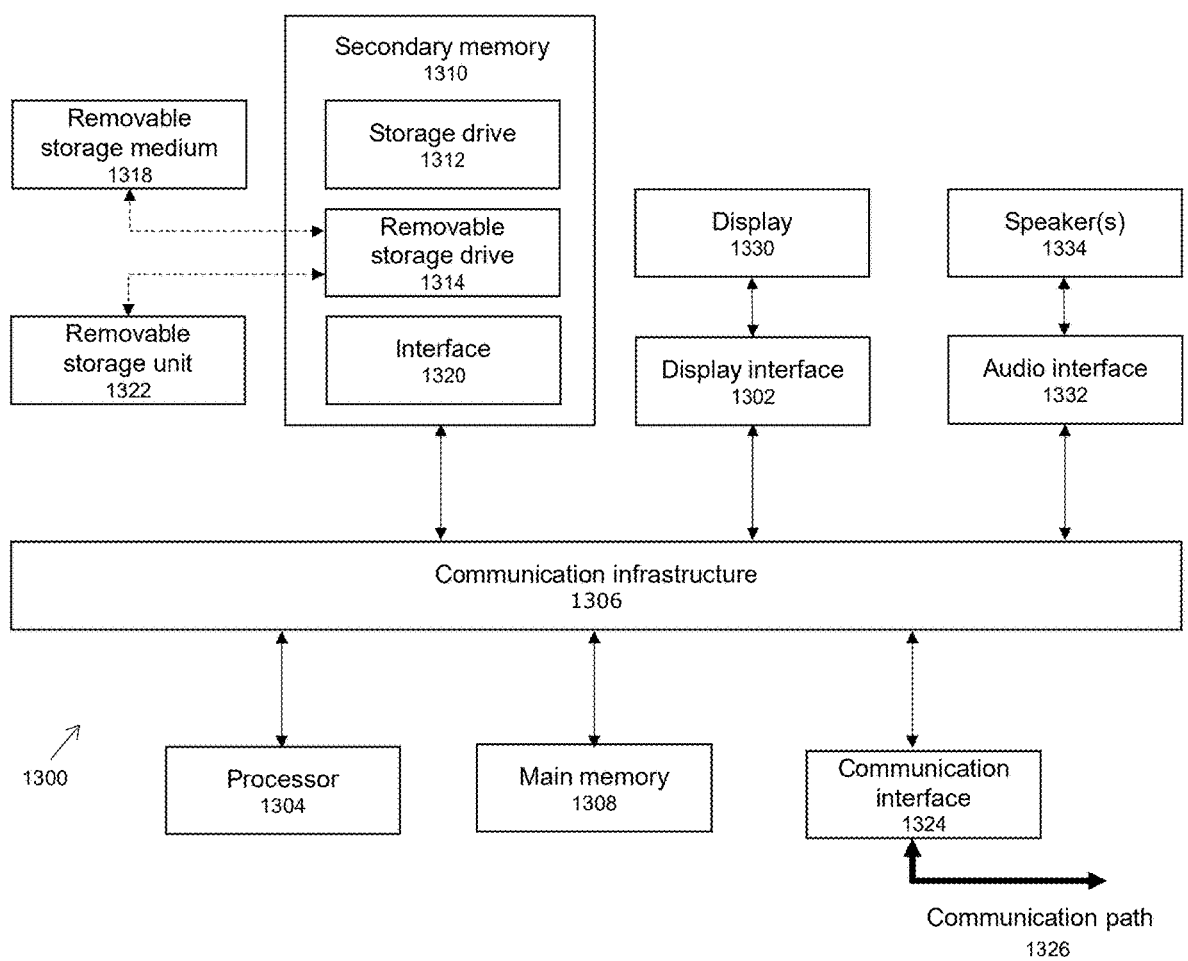
FIG. 13 shows a schematic diagram of an exemplary computing device suitable for use in compressing a video frame.

FIG. 13 shows a schematic diagram of an exemplary computing device suitable for use in compressing a video frame.

FIG. 13 depicts an exemplary computing device 1300, hereinafter interchangeably referred to as a computer system 1300, where one or more such computing devices 1300 may be used as a system for compressing a video frame and execute the processes and calculations as depicted in at least FIGS. 1 to 12. The following description of the computing device 1300 is provided by way of example only and is not intended to be limiting.

As shown in FIG. 13, the example computing device 1300 includes a processor 1304 for executing software routines. Although a single processor is shown for the sake of clarity, the computing device 1300 may also include a multi-processor system. The processor 1304 is connected to a communication infrastructure 1306 for communication with other components of the computing device 1300. The communication infrastructure 1306 may include, for example, a communications bus, cross-bar, or network.

The computing device 1300 further includes a main memory 1308, such as a random access memory (RAM), and a secondary memory 1310. The secondary memory 1310 may include, for example, a storage drive 1312, which may be a hard disk drive, a solid state drive or a hybrid drive and/or a removable storage drive 1314, which may include a magnetic tape drive, an optical disk drive, a solid state storage drive (such as a USB flash drive, a flash memory device, a solid state drive or a memory card), or the like. The removable storage drive 1314 reads from and/or writes to a removable storage medium 1318 in a well-known manner. The removable storage medium 1318 may include magnetic tape, optical disk, non-volatile memory storage medium, or the like, which is read by and written to by removable storage drive 1314. As will be appreciated by persons skilled in the relevant art(s), the removable storage medium 1318 includes a computer readable storage medium having stored therein computer executable program code instructions and/or data.

In an alternative implementation, the secondary memory 1310 may additionally or alternatively include other similar means for allowing computer programs or other instructions to be loaded into the computing device 1300. Such means can include, for example, a removable storage unit 1322 and an interface 1320. Examples of a removable storage unit 1322 and interface 1320 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1322 and interfaces 1320 which allow software and data to be transferred from the removable storage unit 1322 to the computer system 1300.

The computing device 1300 also includes at least one communication interface 1324. The communication interface 1324 allows software and data to be transferred between computing device 1300 and external devices via a communication path 1326. In various embodiments of the disclosures, the communication interface 1324 permits data to be transferred between the computing device 1300 and a data communication network, such as a public data or private data communication network. The communication interface 1324 may be used to exchange data between different computing devices 1300 which such computing devices 1300 form part an interconnected computer network. Examples of a communication interface 1324 can include a modem, a network interface (such as an Ethernet card), a communication port (such as a serial, parallel, printer, GPIB, IEEE 1394, RJ45, USB), an antenna with associated circuitry and the like. The communication interface 1324 may be wired or may be wireless. Software and data transferred via the communication interface 1324 are in the form of signals which can be electronic, electromagnetic, optical or other signals capable of being received by communication interface 1324. These signals are provided to the communication interface via the communication path 1326.

As shown in FIG. 13, the computing device 1300 further includes a display interface 1302 which performs operations for rendering images or videos to an associated display 1330 and an audio interface 1332 for performing operations for playing audio content via associated speaker(s) 1334.

As used herein, the term "computer program product" may refer, in part, to removable storage medium 1318, removable storage unit 1322, a hard disk installed in storage drive 1312, or a carrier wave carrying software over communication path 1326 (wireless link or cable) to communication interface 1324. Computer readable storage media refers to any non-transitory, non-volatile tangible storage medium that provides recorded instructions and/or data to the computing device 1300 for execution and/or processing. Examples of such storage media include magnetic tape, CD-ROM, DVD, Blu-ray Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1300. Examples of transitory or non-tangible computer readable transmission media that may also participate in the provision of software, application programs, instructions and/or data to the computing device 1300 include radio or infra-red transmission channels as well as a network connection to another computer or networked device, and the Internet or Intranets including e-mail transmissions and information recorded on Websites and the like.

The computer programs (also called computer program code) are stored in main memory 1308 and/or secondary memory 1310. Computer programs can also be received via the communication interface 1324. Such computer programs, when executed, enable the computing device 1300 to perform one or more features of embodiments discussed herein. In various embodiments, the computer programs, when executed, enable the processor 1304 to perform features of the above-described embodiments. Accordingly, such computer programs represent controllers of the computer system 1300.

Software may be stored in a computer program product and loaded into the computing device 1300 using the removable storage drive 1314, the storage drive 1312, or the interface 1320. The computer program product may be a non-transitory computer readable medium. Alternatively, the computer program product may be downloaded to the computer system 1300 over the communications path 1326. The software, when executed by the processor 1304, causes the computing device 1300 to perform, as a system for compressing a video frame, the necessary operations to execute the processes, perform the calculations, and other similar computations as shown in FIGS. 1-12.

It is to be understood that the embodiment of FIG. 13 is presented merely by way of example to explain the operation and structure of a system for compressing a video frame. Therefore, in some embodiments one or more features of the computing device 1300 may be omitted. Also, in some embodiments, one or more features of the computing device 1300 may be combined together. Additionally, in some embodiments, one or more features of the computing device 1300 may be split into one or more component parts.

It will be appreciated by a person skilled in the art that numerous variations and/or modifications may be made to the present disclosure as shown in the specific embodiments without departing from the scope of the disclosure as broadly described. The present embodiments are, therefore, to be considered in all respects to be illustrative and not restrictive.

The invention claimed is:

1. A method for compressing a video frame, comprising:
generating, by an invertible neural network (INN) module, a reconstructed motion of a video frame based on an estimated motion between the video frame and a reconstructed video frame, the reconstructed video frame being a reconstruction of another video frame that occurs at a time instance before the video frame, the motion being a transformation from the another video frame to the video frame; and compressing, by a compression module, the video frame based on the reconstructed motion;

wherein the INN module comprises an encoding module and a decoding module, each of the encoding and decoding modules comprising an attentive channel squeeze module;

wherein the generating of the reconstructed motion comprises reducing, by respective attentive channel squeeze modules of the encoding and decoding modules, a channel dimension of the reconstructed motion; and wherein the attentive channel squeeze module comprises a Conv layer and a Conv+ReLu layer without an average pooling operation, the Conv and Conv+ReLu layers being collectively configured to reduce a channel dimension of an output tensor of the INN module so as to improve a performance in multi scale structural similarity index method (MS-SSIM) score when compared with using the average pooling operation in reducing the channel dimension.

2. The method of claim 1, wherein the attentive channel squeeze module further comprises a Generalized Divisive Normalization (GDN) module, and wherein the generating pf the reconstructed motion further comprises gaussianizing, by the GDN module, an image density associated with the reconstructed motion.

3. The method of claim 1, wherein each of the encoding and decoding networks further comprises a feature enhancement module configured for reducing the channel dimension of the reconstructed motion.

4. The method of claim 1, further comprising generating, by a motion estimation module, an estimated motion vector based on the estimated motion between the video frame and the reconstructed video frame.

5. The method of claim 1, further comprising generating, by a temporal context mining module, one or more temporal contexts based on the reconstructed motion and a feature associated with the reconstructed video frame.

6. The method of claim 5, wherein the compressing of the video frame further comprises:

generating, by the compression module, a reconstructed feature associated with the video frame based on the one or more temporal contexts and the video frame; and generating, by a frame generator, the compressed video frame based on the reconstructed feature.

7. A system for compressing a video frame, comprising:
at least one processor; and
at least one memory including computer program code;
the at least one memory and the computer program code configured to, with the at least one processor, cause the system at least to:

generate, by an invertible neural network (INN) module, a reconstructed motion of a video frame based on an estimated motion between the video frame and a reconstructed video frame, the reconstructed video frame occurring at a time instance before the video frame, the motion being a transformation from the another video frame to the video frame; and compress, by a compression module, the video frame based on the reconstructed motion;

wherein the INN module comprises an encoding module and a decoding module, each of the encoding and decoding modules comprising an attentive channel squeeze module;

wherein the generating of the reconstructed motion comprises reducing, by respective attentive channel squeeze modules of the encoding and decoding modules, a channel dimension of the reconstructed motion; and wherein the attentive channel squeeze module comprises a Conv layer and a Conv+ReLu layer without an average pooling operation, the Conv and Conv+ReLu layers being collectively configured to reduce a channel dimension of an output tensor of the INN module so as to improve a performance in multi scale structural similarity index method (MS-SSIM) score when compared with using the average pooling operation in reducing the channel dimension.

8. The system of claim 7, wherein the attentive channel squeeze module further comprises a Generalized Divisive Normalization (GDN) module, and wherein the generating pf the reconstructed motion further comprises gaussianizing, by the GDN module, an image density associated with the reconstructed motion.

9. The system of claim 7, wherein each of the encoding and decoding networks further comprises a feature enhancement module configured for reducing the channel dimension of the reconstructed motion.

10. The system of claim 7, further comprising a motion estimation module configured to generate, based on the estimated motion between the video frame and the reconstructed video frame, an estimated motion vector.

11. The system of claim 7, further comprising a temporal context mining module configured to generate, based on the reconstructed motion and a feature associated with the reconstructed video frame, one or more temporal contexts.

12. The system of claim 11, further comprising a frame generator, wherein the compression module is further configured to generate, based on the one or more temporal contexts and the video frame, a reconstructed feature associated with the video frame; and the frame generator is configured to generate the compressed video frame based on the reconstructed feature.

* * * * *